United States Patent [19]

Schwarzbich

[11] 4,108,469
[45] Aug. 22, 1978

[54] SPRING LEG WITH MOUNTING FOR THE FRONT WHEELS OF AUTOMOBILE VEHICLES

[76] Inventor: Jörg Schwarzbich, Mozartstrasse 10, 4803 Steinhagen, Fed. Rep. of Germany

[21] Appl. No.: 790,191

[22] Filed: Apr. 25, 1977

[30] Foreign Application Priority Data

Jul. 7, 1976 [DE] Fed. Rep. of Germany ....... 2630462

[51] Int. Cl.² .............................................. B60G 11/58
[52] U.S. Cl. .................................. 280/668; 280/696; 267/34
[58] Field of Search ............... 280/668, 696, 691, 710, 280/724; 267/34

[56] References Cited

U.S. PATENT DOCUMENTS 3,346,272  10/1967  Smith ................................... 280/668

Primary Examiner—Philip Goodman
Attorney, Agent, or Firm—Charles E. Baxley

[57] ABSTRACT

In a spring leg for an independently suspended front wheel of an automotive vehicle which has a piston-type shock absorber surrounded by a coil spring wherein one end of the spring rests via a spring cup against the shock absorber's piston rod which in turn rests via a ball bearing assembly against the vehicle's body there is provided the improvement of a circumferential groove in the upper end of the piston rod of the shock absorber to form the inner race for the balls of the ball bearing, a first collar-shaped metal ring surrounding the piston rod and having a portion so shaped and positioned to provide a portion of the outer race for the balls of the ball bearing and a flange radially extending from the shaped portion for fixing to the body of the vehicle, and a second collar-shaped metal ring surrounding the piston rod axially displaced from the first metal ring and surrounding the piston rod, the second metal ring having a portion so shaped and positioned to complete the outer race for the balls of the ball bearing and having a flange radially extending from the shaped portion for resting against the flange of the first metal ring.

14 Claims, 7 Drawing Figures

SPRING LEG WITH MOUNTING FOR THE FRONT WHEELS OF AUTOMOBILE VEHICLES

BACKGROUND OF THE INVENTION

The present invention refers to a spring leg for the individually suspended steered front wheels of automotive vehicles having a shock absorber surrounded by a coil spring which rests via an upper spring cup on the piston rod of the shock absorber, the rod in turn being supported via a ball bearing in a rubber-mounted hood against the body of the vehicle.

One typical prior art device known as a MacPherson spring leg consists essentially of a shock absorber whose housing is connected at its lower end with the wheel mounting and at a distance therefrom connected via another supporting arm to the wheel suspension. At the upper end of the housing there is arranged a lower spring plate on which rests a coil spring surrounding the piston rod of the shock absorber. The piston rod extends from the upper end of the housing of the shock absorber and is provided at its upper end with a recessed collar in which there is seated the upper spring plate for the holding of the coil spring. Above that there is an axial ball bearing whose lower race lies on the upper spring plate and rests on an upper closure cap via a bushing which directly surrounds the piston rod. This upper closure cap is fastened to the piston rod by a nut which is screwed on a thread on the upper end of the piston rod. By means of this nut the upper closure cap is pressed against the collar in the piston rod via the bushing, the lower race of the axial ball bearing, and the spring plate.

The upper race of the axial ball bearing rotatably surrounds the bushing and rests on the inner edge of a hood which extends downwardly and approximately conically outward to approximately the inner part, also conically developed, of the upper spring plate. On the outside of this cap there is arranged a thick circumferential rubber element which rests on its outer side against an outer cap or is firmly connected thereto. This outer cap is of conical or cylindrical shape and is provided on its lower edge with a radially outward protruding flange by which it is firmly connected to the body, for instance, by means of bolts.

This known development of the upper end of the spring leg and its mount requires a relatively large amount of space, particularly in the vertical direction and also requires a considerable expenditure for the mounting since a large number of individual parts must be assembled and pressed together by means of the nut applied on top, against the force of the coil spring on the collar of the piston rod.

SUMMARY OF THE INVENTION

An object of the present invention is to provide a spring leg of the above-mentioned type having an upper mounting which is considerably easier to assemble, takes up less space, and comprises fewer individual parts.

Briefly, the invention is directed to an improvement in a spring leg for an independently suspended front wheel of an automotive vehicle which has a shock absorber surrounded by a coil spring wherein one end of the spring rests via a spring cup against the shock absorber's piston rod which rests via a ball bearing assembly against the vehicle's body. The improvement is characterized by providing the upper end of the piston rod with a circumferential groove as an inner race for the balls of the ball bearing and a first collar-shaped metal ring surrounding the piston rod which has a portion so shaped and positioned to provide a portion of the outer race for the balls of the ball bearing, the ring has a flange radially extending from the shaped portion for resting against and fixing to the vehicle body. There is further provided a second collar-shaped metal ring vertically displaced from the first ring and surrounding the piston rod with a portion so shaped and positioned to complete the outer race for the balls of the ball bearing, and with a flange radially extending from the shaped portion and resting against the flange of the first metal ring.

The upper collar-shaped metal ring is advantageously developed in the manner that it has a short freely radially outwardly projecting flange and rests via a rubber mount against a hood which is connected with the body. The upper collar-shaped metal ring can in suitable manner also be developed on a hood which is spaced from and covers the upper end of the piston rod.

The lower collar-shaped ring can also be developed as a flat annular disc concentric with the piston rod and the upper collar-shaped ring is then continued at the outer circumference of the outer race for the balls of the ball bearing straight downward to the lower collar-shaped ring. It is advantageous to provide, between the portions of the outer races defined by the collar-shaped rings and the inner race of the ball bearing on the piston rod, a ball cage in the shape of a sleeve surrounding the piston rod, in which holes are developed which may have a somewhat smaller diameter than the largest diameter of the balls.

The sleeve forming the ball cage is provided, at least at its upper edge, with an outwardly extending short flange which extends over the upper ring which forms a part of the outer ball race. The sleeve forming the ball cage is somewhat shorter than twice the width of the ball races and also has at its lower end an outwardly extending short flange which extends over the lower ring.

In accordance with another very advantageous embodiment of the invention, outwardly protruding lugs are formed on both sides of the holes of the ball cage. These lugs hold the balls clamped in pushed-out mounting position. The upper ring with the upper part of the outer ball race can also be developed as cylindrical hood covering the upper end of the piston rod and the hood connected with the automobile body may have a further opening with a cylindrical inner edge. Between these two cylindrically developed parts there may be arranged the rubber mount which extends towards the outside by means of two beads gripping over the cylindrical inner edge of the outer hood.

In the vicinity of the outer edge of the lower collar-shaped ring there are advantageously fastened threaded bolts extending 90° vertically. These threaded bolts, by means of their threaded portion arranged on the upper part of the shaft, advantageously extend above mounting holes in the outer hood.

By the forming of the inner ball race of the ball bearing in the upper part of the piston rod which of course is made of the same hardened material as the races of ordinary axial ball bearings and by the provision of the outer ball races on corresponding rings or hoods, the number of individual parts of the upper mount is on the one hand considerably reduced while on the other hand the assembling is considerably simplified. The structural volume and particularly the structural height of the upper mount of the piston rod can also be substantially reduced with the construction in accordance with the invention. A second substantial advantage is obtained by the fact that the upper spring plate is fastened to the piston rod completely independent of the upper mounting of the latter. The spring leg can be premounted, namely even together with the bearing parts, in which connection the balls are held by the special development of the ball cage and of the outer race which initially is attached only loosely. The spring leg thereupon, after the insertion of its upper bearing into a corresponding opening in the body, need merely be firmly attached to the body, whereby the individual bearing parts are also brought into their final operating position of use. In accordance with a special embodiment, it is also possible to connect the upper bearing in firmly engaged manner with the piston rod so that it cannot be removed. This embodiment is particularly advantageous for the supplying of spare parts. In such a case a complete spring leg with spring and support can be supplied, which unit can be inserted without any particular mounting work.

DESCRIPTION OF THE DRAWING

Other objects, features and advantages of the invention will be hereinafter described with reference to the accompanying drawing in which.

DESCRIPTION OF THE PREFERRED EMBODIMENTS

Figure 1:
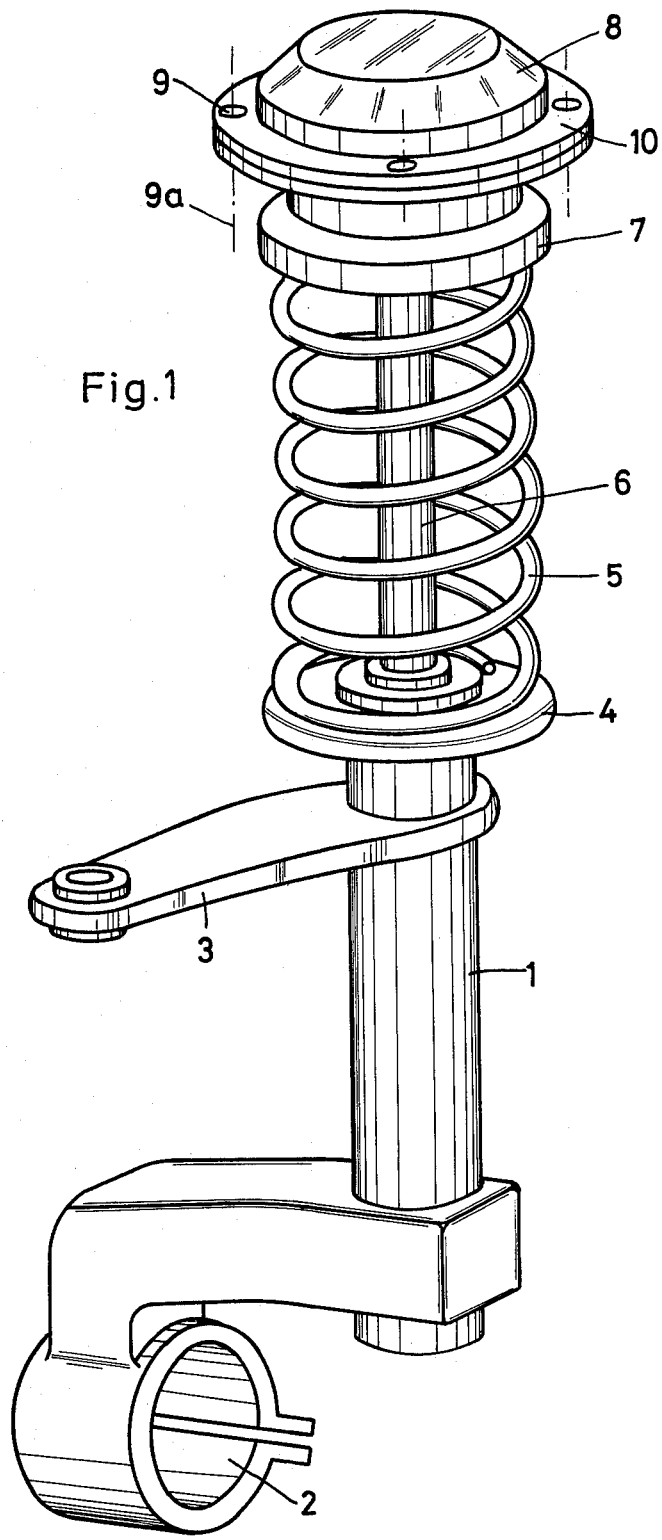
FIG. 1 is an overall perspective view of a complete spring leg.

In FIG. 1 the spring leg for the individually suspended steered front wheels of automotive vehicles is shown consisting of a shock-absorber housing 1, on the lower end of which the wheel mount 2 is fastened. At a distance thereabove there is provided on the housing 1 an extension 3 which is connected with the wheel suspension (not shown). At the upper end of the housing 1 there is the lower spring plate 4 for the supporting of the coil spring 5. The piston rod 6 has below its upper end the attachment for the upper spring plate 7 as the other support for the coil spring 5. The upper end of the piston rod 6 is disposed in the upper shock absorber mount 8. This shock absorber mount 8 is provided with holes 9 on its flange 10 for the attachment and connection to the edge of an opening in the automobile body.

Figure 2:
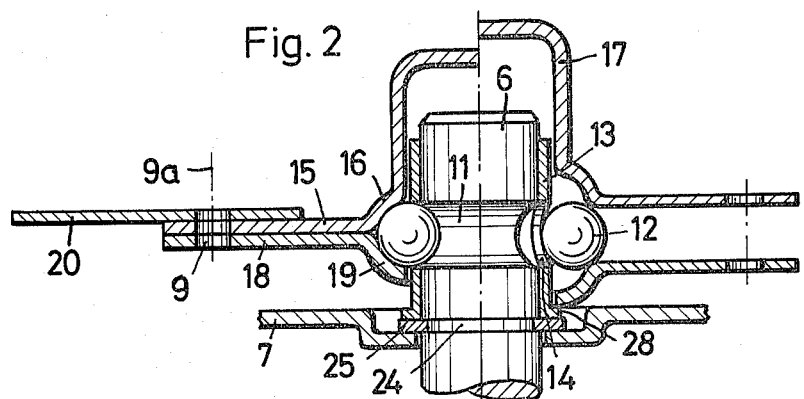
FIG. 2 shows a simple embodiment of the mount without rubber buffering, as seen in section, on the right-hand side before assembly, and on the left-hand side after assembly.

An upper mount 8 without dampening and of a very simple development is shown as first embodiment in FIG. 2. The piston rod 6 is provided near its upper end with a circumferential groove 11 which forms the inner race for the balls 12 of a ball bearing. Above and below this groove 11 the piston rod 6 is surrounded by a ball cage 13 which has essentially the shape of a sleeve and in which there are provided holes 14 which have a somewhat smaller diameter than the largest diameter of the balls 12.

Directly outside the cage 13 there is a collar-shaped metal ring 15. A portion 16 of the ring 15 is so shaped and positioned that its inner surface defines part of the outer race for the balls 12 of the ball bearing. Above this portion 16, the metal ring 15 is shaped to provide a hood 17 which is spaced from and covers the piston rod. A lower, wide collar-shaped ring 18 surrounding the piston rod 6 is also provided, at its inner edge, with a portion 19 whose inner surface defines the lower portion of the outer race for the balls 12 of the ball bearing. The two flanges 15 and 18 of the metal rings have the same diameter and are provided near their outer circumference with the holes 9 for the insertion of bolts for attachment to the body plate 20.

In the further embodiments the same reference numbers have been used for the same parts. In the embodiment shown in FIG. 3, the lower metal ring with its flange 18 is developed in the same manner as in the preceding example. The upper metal ring however has only a very short flange 15 and is not continued above the race portion 16. This upper metal ring 15, 16 rests against a solid strong rubber cushion 21 which is arranged approximately in ring shape in a hood 22 having a center opening in the vicinity of the piston rod 6. The hood 22 is developed as a flat cone and is provided at its outer circumference with a flange 23, holes 9 being arranged in flanges 18 and 23, for attachment by bolts to the body plate 20.

Mounting will be explained on basis of this embodiment. A notch 24 is cut in the piston rod 6 to receive a spring ring 25 which forms the abutment for the upper spring plate 7.

Figure 3:
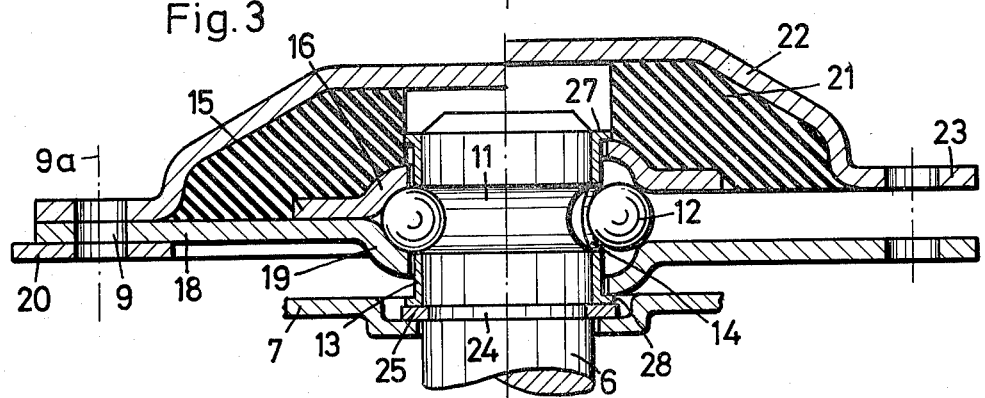
FIG. 3 shows a simple embodiment with rubber mount, on the right-hand side before assembly, and on the left-hand side after assembly.

The upper spring-leg bearing is assembled before the actual mounting in the manner shown on the right-hand side of the sectional view of FIG. 3. The ball cage 13 is provided on its upper and lower ends with short outward-extending flanges 27, 28 which, on the one hand, secure it against displacement with respect to the inner edges of the outer ball races on the ring 15, 16 and the ring 18, 19, and, on the other hand, permit these rings only limited displacement from each other and thus a limited spacing from each other. At this limited spacing shown on the right-hand side of FIG. 3, the balls of the ball bearing can move backwards to such an extent out of the cage that they rest against the adjacent edges of the race portions 16 and 19. These edges of the outer race portions have in this position a clearance which is less than the largest diameter of the balls so that the balls cannot drop outward before the bearing is mounted. The flanges 27 and 28 also prevent the lower bearing ring 18, 19 from dropping down. Furthermore, the bearing in its "premounted state", as shown on the right-hand side of FIG. 3, can be adjusted and held by the fastening bolts 9a which have been shown merely in dot-dash line. In this position the upper end of the piston rod 6 of the spring leg can be introduced into the mount. The balls then move away towards the outside. Upon the compressing and fastening by means of the bolts 9a, the rings are then pressed against each other and the balls are thus brought into the position shown on the left-hand side of FIG. 3.

After the insertion of the piston rod 6, the lower ring 18, 19 is pressed upward so that the balls 12 are pressed through the holes 14 in the bearing cage 13 into the groove 11 of the piston rod 6 which forms the inner race for the balls. At this point, the position corresponding to the left-hand half of FIG. 3 is reached and the upper spring-leg bearing can be connected with the body by the bolts 9a in the corresponding bolt holes 9. Upon the spring action and in particular the so-called striking of the piston rod 6, the latter, with the lower part of the ball race, presses against the balls 12 which in their turn press against the upper portion of the outer ball race 16 on the ring 15 and press the latter, as a whole, against the resilient rubber mount 21 against the hood 22, the upper ring 15, 16 lifting off somewhat from the lower ring 18, 19.

Figure 4:
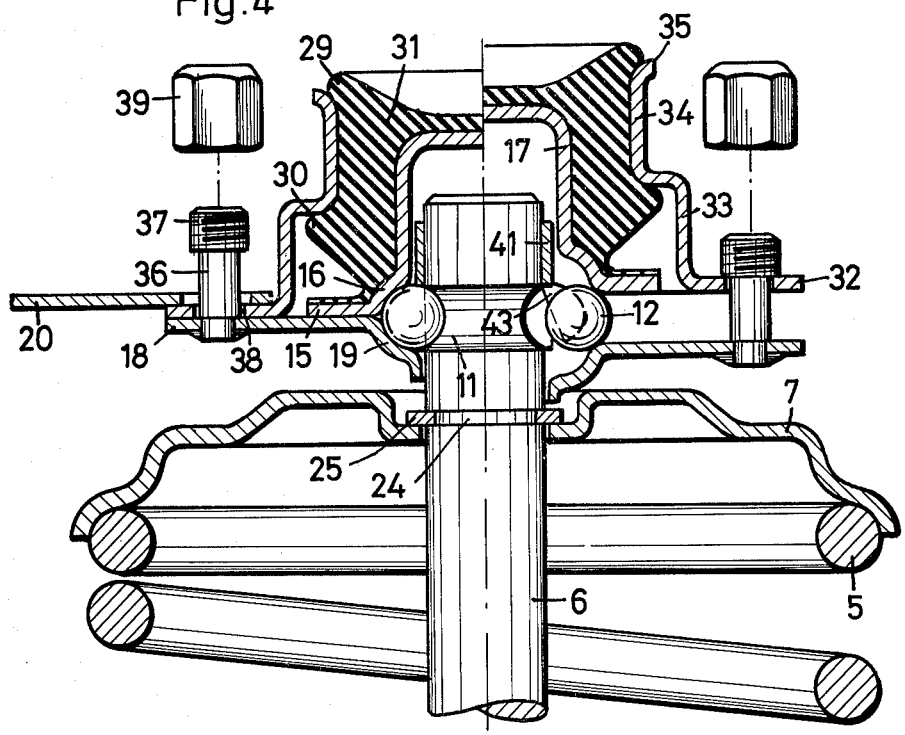
FIG. 4 shows another embodiment of the spring leg and the mount, in which the coil spring is also shown.

In the embodiment shown in FIG. 4, the same reference numbers also apply to the same parts. In this embodiment also the upper metal ring is only provided with a short flange 15, but, similar to the embodiment of FIG. 2, it is connected as a single piece with a hood 17 which is spaced from and covers the upper end of the piston rod 6. This hood 17 is surrounded, up to the lower outer circumference of the upper outer ball race portion 16, by a strong approximately cylindrical rubber 31 which is preferably vulcanized in position. The outer circumference of the part 31 has an upper bead 29 and a lower bead 30.

An outer mount is formed from a cylindrically stepped metal member having a lower outward extending flange 32, an inner cylinder 33 above the same and above cylinder 33 another cylinder 34 which is pulled inward in step-shaped manner. The cylindrical part 34 is provided at its upper end with an outwardly bent short flange 35. It surrounds the thick rubber part 31, of cylindrical development at its outer circumference, between the two beads 29 and 30 so that rubber part 31 is held firmly in the cylindrical part 34 to resist in particular upward displacement.

On the flange 18 of the lower collar-shaped metal ring there are welded vertical bolts 36 which are provided at their upper end with a thread 37 of increased diameter. The arrangement is such that the corresponding holes 38 for these bolts in the flange 32 of the upper cylindrical holding part have approximately the same diameter as the shaft parts of the bolts 36 below the thread 37 but a smaller diameter than the thread 37, so that the upper cylindrical holding part is held together with the flange 32 by the bolts 36, welded to the flanges 18 of the lower collar-like metal rings, in the position shown on the right-hand side of FIG. 4. This bearing is inserted from the bottom together with the bolts 36 into corresponding holes in the body plate 20 and fastened by means of cap nuts 39. Upon the tightening of the cap nuts 39, the flanges 32 and 18 are pressed together and in this way the balls 12 are also pressed through the corresponding holes 14 in the cage inwards into their inner race 11 in the piston rod 6.

In this as well as in other embodiments of the spring-leg bearing in accordance with the invention, there is also the possibility of welding the flange 18 and the flange 32 of the two parts, forming so to speak the housing, to each other after the mounting of the bearing or rigidly fastening them together in some other manner. The finished bearing can then be forced onto the piston rod 6, the balls 12 of the ball bearing being pressed outwards by a bevel arranged on the top of the piston rod 6, with the simultaneous compression of the rubber part 31 and the pushing upwards of the upper collar-like metal ring 16, 15. The outwardly pressed balls 12 then snap into the ball race 11 in the piston rod 6, after which the bearing can no longer be removed from the piston rod 6.

Figure 6:
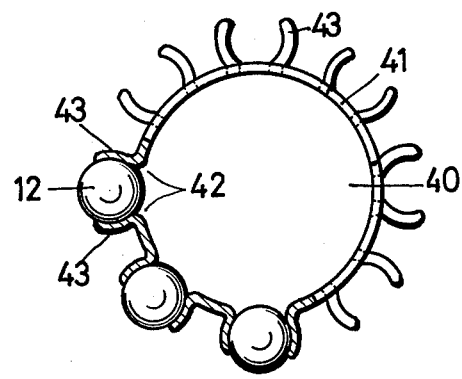
FIG. 6 is a top view of the ball cage, for instance, in accordance with FIGS. 4 and 5.
Figure 7:
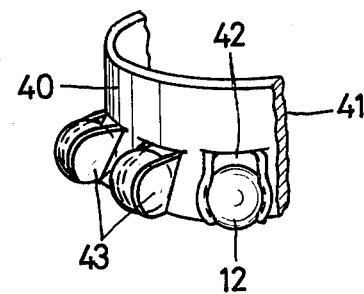
FIG. 7 is a radial section through the ball cage of FIG. 6.

FIG. 4 also shows another form of a ball cage 10. This ball cage will be explained in connection with FIGS. 6 and 7. A cylindrical sleeve 41 is provided with the corresponding holes 42 for the guiding of the balls 12. On both sides of the holes 42 there are developed outwardly protruding lugs 43 which surround and grip the balls. In the position of the balls shown in FIG. 6 and when the balls therefore have penetrated so far out of the cylindrical cage that their circumference rests against the inner circumference of the ring 41, the lugs 43 surround the balls 12 over somewhat more than their largest diameter, so that the balls are securely held in this position on the ball cage when they are pressed outwards by the entering piston rod 6. The lugs 43 are advantageously arranged on arms of the ball cage - between the holes for the holding of the balls - these arms being arranged somewhat obliquely outward in downward direction so that their lower edge lies on a larger diameter than their upper edge. In this way the balls are held outwards against the upper ring before the insertion of the piston rod, and, in particular, also before the insertion and pushing on of the lower ring, so that they clear the diameter required upon the insertion by the piston rod. Only after the insertion of the piston rod and the aligning of its groove 11 as the inner ball race are the balls 12 pushed, upon the pressing of the lower ring against the upper ring, into position between the two outer race portions on the rings, with the swinging of the lugs on the flanges inward, as shown on the left-hand side, for instance, of FIG. 5. This embodiment of the ball cage can be used for various embodiments of the spring-leg bearing in accordance with the invention. The ball cages are preferably made from a polyamide plastic.

Figure 5:
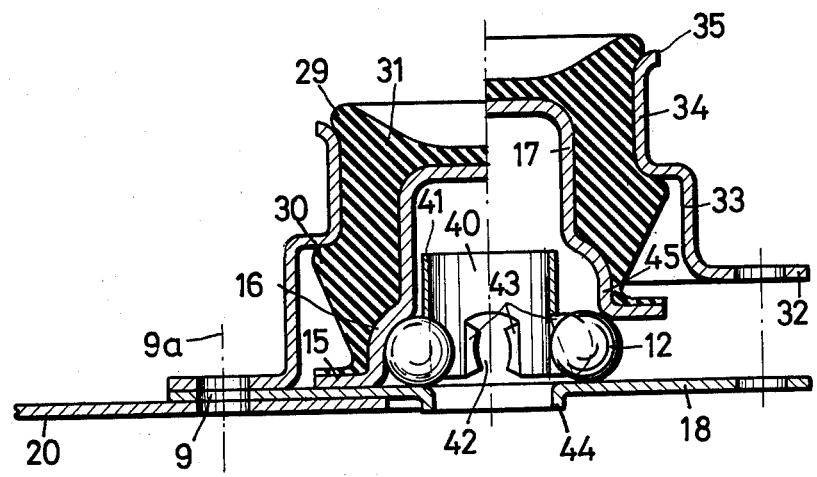
FIG. 5 shows another embodiment of the mount without the piston rod being shown.

Another example of a spring-leg bearing is shown in FIG. 5. This embodiment is derived from the construction of FIG. 4. In the embodiment shown in FIG. 5, the lower collar-like ring is made continuously flat and planar, merely with a short bent flange 44 on the inner edge. The travel surface for the balls 12 is in the region beyond this flange.

The upper collar-like ring together with its ball race portion 16 is developed in the manner that the race portion is pulled downward at its greatest diameter forming a short cylinder 45 up to the lower collar-shaped ring or the flange 18 thereof so that the outwardly protruding short flange part 15 adjoining the ball race portion 16 rests on this collar-shaped ring 18. This embodiment of a spring-leg bearing is closed off flat towards the bottom and could be placed with this flat closure surface on the body of the vehicle. In such case only a relatively small opening would be necessary, the diameter of opening being not much greater than the diameter of the piston rod 6.

I claim:
1. In a spring leg for an independently suspended front wheel of an automotive vehicle which has a piston-type shock absorber surrounded by a coil spring wherein one end of the spring rests via a spring cup against the shock absorber's piston rod which rests via a ball bearing assembly against the vehicle's body, the improvement comprising a circumferential groove in the upper end of the piston rod of the shock absorber to provide the inner race for the balls of the ball bearing, a first collar-shaped metal ring surrounding the piston rod which has a portion so shaped and positioned to provide a portion of the outer race for the balls of the ball bearing, said first metal ring having a flange radially extending from said shaped portion and for fixing to the body of the vehicle, and a second collar-shaped metal ring surrounding the piston rod axially displaced from said first metal ring and surrounding the piston rod, said second metal ring having a portion so shaped and positioned to complete the outer race for the balls of the ball bearing and having a flange radially extending from said shaped portion for resting against the flange of said first metal ring.

2. The spring leg of claim 1 further comprising a hood, the flange of said first metal ring and said hood being connected to the body of the vehicle whereby said first metal ring and the hood provide an enclosure, a rubber mount in the enclosure and the flange of said second metal ring being in the enclosure and resting against said rubber mount.

3. The spring leg of claim 1 wherein said second metal ring has a further portion which is so shaped to form a hood which covers the end of the piston rod.

4. The spring leg of claim 1 wherein the flange and the portion of said first metal ring which forms a portion of the outer race are coplanar, and the portion of said second metal ring is substantially cylindrical in the region where the balls are located.

5. The spring leg of claim 1 further comprising a ball cage in the form of a sleeve about the piston rod in the region of the groove for holding the balls, said ball cage being provided with a plurality of circumferential holes having diameters less than the diameter of the balls.

6. The spring leg of claim 5 wherein said ball cage is provided at one end with a flange for overhangingly abutting against the shaped portion of said second metal ring.

7. The spring leg of claim 6 wherein said ball cage is provided at the other end with another flange for overhangingly abutting against the shaped portion of said first metal ring.

8. The spring leg of claim 5 wherein said ball cage is provided lugs extending outwardly from the edges of holes of the ball cages for clamping the balls in a particular position.

9. The spring leg of claim 8 wherein said lugs are developed on obliquely downwardly extending arms.

10. The spring leg of claim 5 wherein said ball cage is of plastic.

11. The spring leg of claim 10 wherein said ball cage is of a polyamide plastic.

12. The spring leg according to claim 1 wherein said second metal ring has another portion so shaped to form a cylindrical hood which covers the upper end of the piston rod, and further comprising a cylindrically stepped metal member coaxially surrounding and spaced from said second metal ring, said stepped metal member being provided with a flange for resting against the flange of said first metal ring and a circumferential shoulder axially displaced from its flange, and an elastomeric shock mount member coaxially positioned between the cylindrical hood and the cylindrically stepped member.

13. The spring leg of claim 12 wherein on the flange of the first metal ring there are fastened a plurality of bolts.

14. The spring leg of claim 13 wherein the flange of said cylindrically stepped metal member is provided with holes through which pass said bolts, the ends of said bolts beyond said flange have diameters greater than the diameters of said holes and being provided with threads.

* * * * *